Oct. 9, 1928.

C. S. CROSS 1,687,239

EDUCATIONAL TOP

Filed July 2, 1927

Inventor

Charles S. Cross,

By C. P. Goepel,

Attorney

Patented Oct. 9, 1928.

1,687,239

UNITED STATES PATENT OFFICE.

CHARLES S. CROSS, OF BROOKLYN, NEW YORK; ALEXANDER B. BOYER ADMINISTRATOR OF SAID CHARLES S. CROSS, DECEASED.

EDUCATIONAL TOP.

Application filed July 2, 1927. Serial No. 203,014.

The present invention relates to an educational top, and more particularly to a combined top and educational device.

An object of the present invention is to provide a simplified construction of top which embodies a spherical or globe portion upon which may be depicted the map of the earth, and which may be supported in one position for a study of the earth, and which may be inverted or placed in another position for use as a top.

The invention aims to provide a combined device of this character which utilizes but a single spindle or shaft for supporting a balance wheel, a base member upon which the device may rest for a careful study or inspection of the map, and which device is also useful as a means for initiating the spinning of the fly wheel, so that the device may be spun as a top without any additional appurtenances or parts, the spindle being useful as a support for the spherical body in either of its positions.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation of the educational top supported on its base for studying the map depicted on the body of the top.

Figure 1:
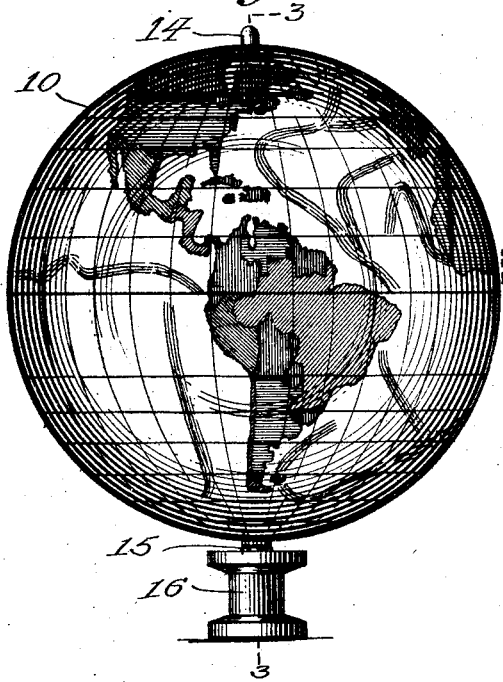
Figure 2:
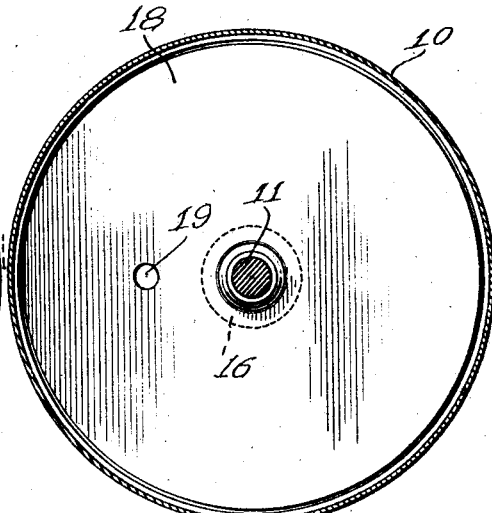
Figure 2 is a horizontal section taken on the line 2—2 of Figure 1, showing the balance wheel within the middle portion of the body.
Figure 3:
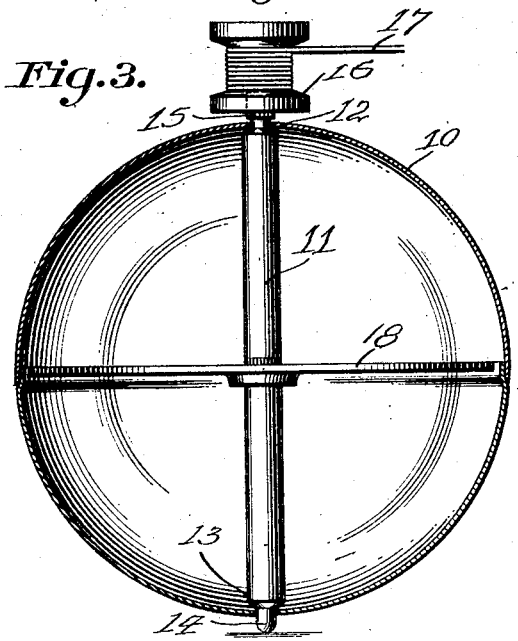
Figure 3 is a vertical section taken through the top on the line 3—3 of Figure 1 in inverted position for spinning, and illustrating the manner in which the base member may be utilized for initiating the spinning of the top.

Referring to the drawing 10 designates the body of the top which is preferably of spherical contour, and which is hollow, the same being preferably constructed of sheet metal and which for convenience in manufacture and assembly may be made in upper and lower halves as clearly shown in Figures 1 and 3. The spherical body 10 has depicted upon its exterior surface a map of the world, or the like, so that a child may carefully study the configurations of the various continents, islands and the like, and thus gain a direct impression of the relation between the geographical configurations of the earth by actually handling the object which is of the general configuration of the earth itself. The spherical body 10 is adapted to be disposed vertically with respect to the north and south polar portions of the map depicted upon the sphere, and is mounted upon a vertical or axial spindle 11, which passes through the sphere 10 from top to bottom and coincides with the polar axis upon which the earth revolves.

Figure 4:
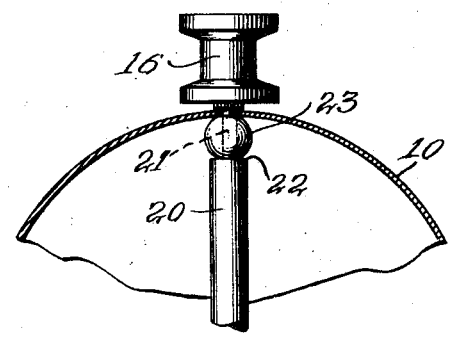
Figure 4 is a fragmentary sectional view through the base end of the top, showing a modified form of spindle mounting.

The spindle 11 is reduced near its opposite ends and beveled to provide bearing shoulders 12 and 13 adapted to engage the inner wall of the sphere 10 respectively at the bottom and top portions thereof for maintaining the sphere 10 from shifting longitudinally upon the spindle 11. The upper end of the spindle 11 projects a short distance beyond the shoulder 13 and may be rounded or pointed to provide a bearing tip 14 upon which the spindle may rest when the device is used as a top, as shown in Figure 3. The other end of the spindle 11, beyond the shoulder 12, is extended a short distance and provided with a preferably knurled head 15 of suitable size to bind and bight into the end of a spool 16 or the like which forms the base and spinning member of the toy. The spool 16 has a flanged head at opposite ends with an intermediate drum portion upon which is adapted to be wound a cord 17 or the like which is used for turning the spool 16 by drawing the cord 17 in the usual manner of spinning tops, while the sphere 10 is held in the hand. The outer end of the spool or base member 16 is flat, as shown in Figures 1, 3 and 4, and serves to support the toy in upright position upon a flat surface, such as shown in Figure 1. The sphere 10 when supported in upright position may be turned at convenience in either direction, so that a careful inspection may be made of the map and the device thus used as an educational device or for the purposes of obtaining geographical information.

In order to stabilize the sphere 10 in its upright position the spindle 11 is provided with a weight or fly wheel 18, which is fixed upon the spindle 11 to turn therewith, and which is of suitable thickness and diameter to serve its purpose. As shown, the fly wheel 18 is of sufficient diameter to closely approach the inner wall of the sphere 10 at the horizontal great circle thereof, or at the line of meeting between the sphere sections which corresponds substantially to the equatorial line of the map depicted on the sphere. This fly wheel 18 thus firmly seats the base member 16 upon the flat supporting surface, so that the sphere 10 is held upright and can only be upset by an abnormal pressure against the side of the sphere.

The fly wheel 18 is also utilized as a gyroscope or balance wheel for spinning the top when the latter is inverted, as shown in Figure 3, so as to support the spindle 11 in substantially upright position while the latter is turning at a high rate of speed. While in this position the sphere 10 supported upon the shoulder 14 has turned at a relatively slow speed as it is driven or rotated only by virtue of the frictional contact between the shoulder 12 and the upper end of the sphere 10. The fly wheel 18 may be provided with one or more openings 19 for the purpose of admitting free passage of air through the fly wheel and also for counter-balancing the fly wheel, if desired.

In the modified construction shown in Figure 4, the axial spindle 20 is provided near its base end with a reduced pin portion 21 which is provided by forming a shoulder 22 near the base end of the spindle in spaced relation to the adjacent wall of the sphere 10 to accommodate a ball or other bearing member 23 between the shoulder 22 and the adjacent end of the sphere 10. The ball 23 is provided diametrically with an opening adapted to freely receive the pin 21 therethrough so that the ball 23 may freely turn on the pin and provide a ball bearing mounting for the sphere 10 when the latter is inverted and used as a top. In this instance, the sphere 10 is turned at a very low rate of speed so that the map upon the exterior surface of the sphere, although inverted may be readily examined.

The base member 16 thus not only serves as a support for the sphere 10 for educational purpose, but also serves as a means about which the cord 17 may be wound for spinning the device when it is to be used as a toy or top. The fly wheel 18 serves not only in capacity of holding the sphere in upright position when the base member is seated upon a flat surface, but also serves as a gyroscope or balance wheel for maintaining the spindle 11 in spinning condition for a relatively long time after the cord has been drawn off from the base member 16, and also for maintaining the spindle 11 in substantially upright position during the spinning action.

I have illustrated and described a preferred and satisfactory embodiment of my invention, but it is obvious that changes may be made therein within the spirit and scope thereof as defined in the appended claims.

What is claimed is:—

1. A toy top comprising a hollow spherical body, a map depicted on the outer surface of said body, a spindle diametrically positioned through the body and having bearing at opposite ends through the diametrically opposed portions of the body, the bearing portion at one end of the spindle adapted to serve as a tip for supporting the body in one position when used as a top, a base member mounted on the other bearing portion of the spindle exteriorly of the body for supporting the latter in upright position upon a flat surface, said base member having a drum portion thereon adapted to receive a spinning cord for initiating the rotation of the spindle, and a balance wheel mounted within the body on the spindle for balancing the spindle in upright position when raised on the base member and when spinning on said tip.

2. A toy top comprising a hollow spherical body having a map of the world depicted upon its exterior surface, a spindle arranged diametrically through the body with respect to the north and south poles depicted thereon, said spindle having bearing at opposite ends in the pole portions of the body and extending exteriorly of the body for maintaining the spindle therein, one end of said spindle serving as a tip for supporting the body in inverted position, a base member mounted on the other exterior end of the spindle for supporting the body in upright position upon a flat surface, and permitting rotation of the body on the spindle for examining the map depicted thereon, said base member having a drum portion thereon adapted to receive a spinning cord for initiating the turning of the spindle to spin the same when the body is inverted to rest on said tip, and a balance wheel carried upon the spindle within the body to turn with the spindle for maintaining the latter in substantially vertical position when the body is in upright and in inverted positions.

3. A toy top comprising a hollow spherical body having a map of the world depicted upon the exterior surface of the body, a spindle arranged vertically through the body with respect to the pole portions thereof and having reduced portions extending through the body to provide bearings for supporting the body on the spindle, a base member carried upon one end of the spindle exterior of the body for seating upon a flat surface to support the body in upright position and adapted to be spun for spinning the spindle, the other end of said spindle providing a tip for supporting the body in inverted position when the spindle is spun, and a balance wheel fixed upon the spindle and disposed within the body for maintaining the spindle in vertical position when the body is in either upright or inverted positions.

4. A toy top comprising a hollow spherical body, a map depicted on the outer surface of said body, a spindle arranged vertically in the body and projecting at opposite ends therebeyond, a base member mounted on the lower end of the spindle for supporting the latter in upright position upon a flat bearing surface, said base member adapted to be spun for rotating the spindle and the upper end of said spindle providing a tip for supporting the spindle when inverted, a balance wheel mounted upon the spindle within the body for maintaining the spindle upright in either position, and a bearing member mounted for rotation on the lower end of the spindle between the latter and the lower wall of the body to provide a bearing for supporting the body upon the spindle when the latter is inverted.

5. A toy top comprising a hollow spherical body, a map depicted on the outer surface of said body, a spindle arranged diametrically through the body and projecting at its ends beyond the same, one end of the spindle providing a tip for supporting the body when used as a top, the other end of said spindle having an enlarged knurled head, a spool base member frictionally mounted upon said head to turn therewith and having an outer flat face adapted to engage a flat supporting surface for supporting the body in upright position, said spindle base member being adapted to receive a spinning cord thereon for turning the base member to spin the spindle, and balance means mounted upon the spindle within the body for maintaining the latter upright in either position of the spindle.

In testimony that he claims the foregoing as his invention, he has signed his name hereto.

CHARLES S. CROSS.